(12) United States Patent
Ibrahim et al.

(10) Patent No.: US 9,577,699 B2
(45) Date of Patent: *Feb. 21, 2017

(54) DUAL ANTENNA TOPOLOGY FOR BLUETOOTH AND IEEE 802.11 WIRELESS LOCAL AREA NETWORK DEVICES

(71) Applicant: Broadcom Corporation, Irvine, CA (US)

(72) Inventors: Brima Ibrahim, Aliso Viejo, CA (US); Prasanna Desai, Olivenhain, CA (US); Mark Gonikberg, Los Altos Hills, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,549

(22) Filed: Apr. 13, 2015

(65) Prior Publication Data

US 2015/0222316 A1 Aug. 6, 2015

Related U.S. Application Data

(60) Continuation of application No. 14/077,124, filed on Nov. 11, 2013, now Pat. No. 9,031,608, which is a division of application No. 11/880,257, filed on Jul. 20, 2007, now Pat. No. 8,615,270.

(60) Provisional application No. 60/909,698, filed on Apr. 2, 2007.

(51) Int. Cl.
  *H04M 1/00* (2006.01)
  *H04B 1/401* (2015.01)
  *H01Q 21/29* (2006.01)
  *H04B 7/04* (2006.01)
  *H04B 1/44* (2006.01)
  *H04W 88/06* (2009.01)

(52) U.S. Cl.
  CPC .............. *H04B 1/401* (2013.01); *H01Q 21/29* (2013.01); *H04B 1/44* (2013.01); *H04B 7/04* (2013.01); *H04W 88/06* (2013.01)

(58) Field of Classification Search
  CPC . H04W 88/06; H04M 1/72519; H04B 7/0669; H04L 1/06
  USPC ............... 455/552.1, 550.1, 101; 370/334
  See application file for complete search history.

(56) References Cited

U.S. PATENT DOCUMENTS

| | | | |
|---|---|---|---|
| 6,185,205 B1 | 2/2001 | Sharrit et al. | |
| 6,373,832 B1 * | 4/2002 | Huang | H04B 7/0671 370/342 |
| 6,560,443 B1 | 5/2003 | Vaisanen et al. | |
| 7,120,456 B1 | 10/2006 | Elliot et al. | |
| 7,349,655 B2 * | 3/2008 | Fukuda | G03G 9/09 399/223 |

(Continued)

*Primary Examiner* — Danh Le
(74) *Attorney, Agent, or Firm* — McDermott Will & Emery LLP

(57) ABSTRACT

A method includes determining that an antenna shared between a Bluetooth transceiver and a WLAN transceiver is available to the WLAN transceiver based on an activity signal associated with the Bluetooth transceiver. Access to the shared antenna is provided to the WLAN transceiver based on the determination, and the WLAN transceiver is configured to use diversity in transacting WLAN signals via a plurality of antennas, including the shared antenna. Access to the shared antenna is transferred from the WLAN transceiver to the Bluetooth transceiver based on the activity signal.

19 Claims, 8 Drawing Sheets

(56) References Cited

U.S. PATENT DOCUMENTS

| | | | |
|---|---|---|---|
| 7,352,332 B1 | 4/2008 | Betts-LaCroix et al. | |
| 2004/0114499 A1* | 6/2004 | McClellan | G11B 7/0037 |
| | | | 369/273 |
| 2004/0116075 A1 | 6/2004 | Shoemake et al. | |
| 2006/0030265 A1 | 2/2006 | Desai et al. | |
| 2006/0038738 A1 | 2/2006 | Shtrom | |
| 2006/0111115 A1 | 5/2006 | Marin et al. | |
| 2006/0160563 A1 | 7/2006 | Ku | |
| 2007/0066222 A1 | 3/2007 | Tao et al. | |
| 2007/0070961 A1* | 3/2007 | Tao | H04W 16/14 |
| | | | 370/338 |
| 2007/0103372 A1* | 5/2007 | Yu | G06F 1/1616 |
| | | | 343/702 |
| 2007/0142001 A1* | 6/2007 | Sanders | H04B 1/006 |
| | | | 455/101 |
| 2008/0058883 A1* | 3/2008 | Gautier | G06F 1/3203 |
| | | | 607/29 |
| 2008/0137566 A1 | 6/2008 | Marholev et al. | |
| 2008/0146163 A1* | 6/2008 | Korneluk | H04B 7/0689 |
| | | | 455/73 |

* cited by examiner

FIG. 2

DUAL ANTENNA TOPOLOGY FOR BLUETOOTH AND IEEE 802.11 WIRELESS LOCAL AREA NETWORK DEVICES

CROSS-REFERENCE TO RELATED APPLICATIONS

This application is a continuation of U.S. patent application Ser. No. 14/077,124, filed Nov. 11, 2013, issued as U.S. Pat. No. 9,031,608, which is a divisional of U.S. patent application Ser. No. 11/880,257, filed on Jul. 20, 2007, issued as U.S. Pat. No. 8,615,270, which claims priority under 35 U.S.C. §119(e) to U.S. Provisional Application No. 60/909,698, filed on Apr. 2, 2007, all of which are incorporated herein by reference and made a part hereof.

TECHNICAL FIELD

This description relates to wireless communication networks and more particularly to a dual antenna topology for use in such a network.

BACKGROUND

The use of Wireless Personal Area Networks (WPANs) has been gaining popularity in a great number of applications because of the flexibility and convenience in connectivity they provide. WPAN systems, such as those based on Bluetooth (BT) technology, replace cumbersome cabling and/or wiring used to connect peripheral devices and/or mobile terminals by providing short distance wireless links that allow connectivity within a short (e.g., 10-meter) range. In contrast to WPAN systems, Wireless Local Area Networks (WLANs) provide connectivity to devices that are located within a larger geographical area, such as the area covered by a building or a campus, for example. WLAN systems based on IEEE 802.11 standard specifications, typically operate within a 100-meter range, and are generally utilized to supplement the communication capacity provided by traditional wired Local Area Networks (LANs) that are installed in the same geographic area as the WLAN system.

In some instances, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, speaker, and/or printer, while the laptop computer or the handheld wireless terminal is also connected to a WLAN network through an access point (AP) located within the building.

Both Bluetooth and WLAN radio devices, such as those used in, for example, handheld wireless terminals, generally operate in the 2.4 GHz (2.4000-2.4835 GHz) Industrial, Scientific, and Medical (ISM) unlicensed band. Other radio devices, such as those used in cordless phones, may also operate in the ISM unlicensed band. While the ISM band provides a suitable low-cost solution for many of short-range wireless applications, it may also have some drawbacks when multiple users or devices operate simultaneously within the band in a small geographic area. For example, because of the limited bandwidth, spectrum sharing may be necessary to accommodate multiple users. Multiple active users may also result in significant interference between operating devices. Moreover, in some instances, microwave ovens may also operate in this frequency spectrum and may produce significant interference or blocking signals that may affect Bluetooth and/or WLAN transmissions.

It may be that a single device, such as a laptop, may perform both WLAN and Bluetooth transactions. In such a situation not only does the problem of potential interference arise, but also due at least in part to the specifications (e.g., size and power consumption) of the device, WLAN and Bluetooth radio devices (e.g., transceivers) may share one or more antennas. It may then be desirable that when a shared antenna is idle (e.g., due to the inactivity of a radio device, such as the Bluetooth radio device), it may be accessible to another radio device (e.g., the WLAN radio device) to increase throughput and/or reliability associated with the wireless transactions.

SUMMARY

In a first general aspect, a system includes a first antenna, a second antenna, a Bluetooth transceiver, WLAN transceiver, and an antenna control processor. The Bluetooth transceiver is configured to transmit Bluetooth signals and to receive Bluetooth signals via one of the antennas. The WLAN transceiver is configured to transmit and receive WLAN signals via one or both of the antennas. The antenna control processor configured to operatively couple the second antenna to the Bluetooth transceiver to transmit Bluetooth signals and configured to operatively couple the second antenna to the WLAN transceiver when Bluetooth signals are not transmitted, thereby allowing the WLAN transceiver to utilize diversity associated with transmitting or receiving the WLAN signals via the first and second antennas.

In another general aspect, a method includes receiving one or more signals associated with a first transceiver via a plurality of antennas, where the first transceiver is configured to use diversity associated with the transmission or reception of the signals via two or more of the plurality of antennas. It is determined, based on an activity of a second transceiver, that the second transceiver requires access to one or more of the antennas shared between the first transceiver and the second transceiver, and access is transferred to one or more of the shared antennas from the first transceiver to the second transceiver based on the determination.

In another general aspect, a method includes determining that an antenna shared between a Bluetooth transceiver and a WLAN transceiver is available to the WLAN transceiver based on an activity signal associated with the Bluetooth transceiver. Access to the shared antenna is provided to the WLAN transceiver based on the determination, and the WLAN transceiver is configured to use diversity in transacting WLAN signals via a plurality of antennas, including the shared antenna. Access to the shared antenna is transferred from the WLAN transceiver to the Bluetooth transceiver based on the activity signal. The details of one or more implementations are set forth in the accompanying drawings and the description below. Other features will be apparent from the description and drawings, and from the claims.

BRIEF DESCRIPTION OF THE DRAWINGS

FIG. 2 is a timing diagram that illustrates an exemplary communication of the system of FIG. 1 according to an example embodiment.

DETAILED DESCRIPTION

Figure 1:
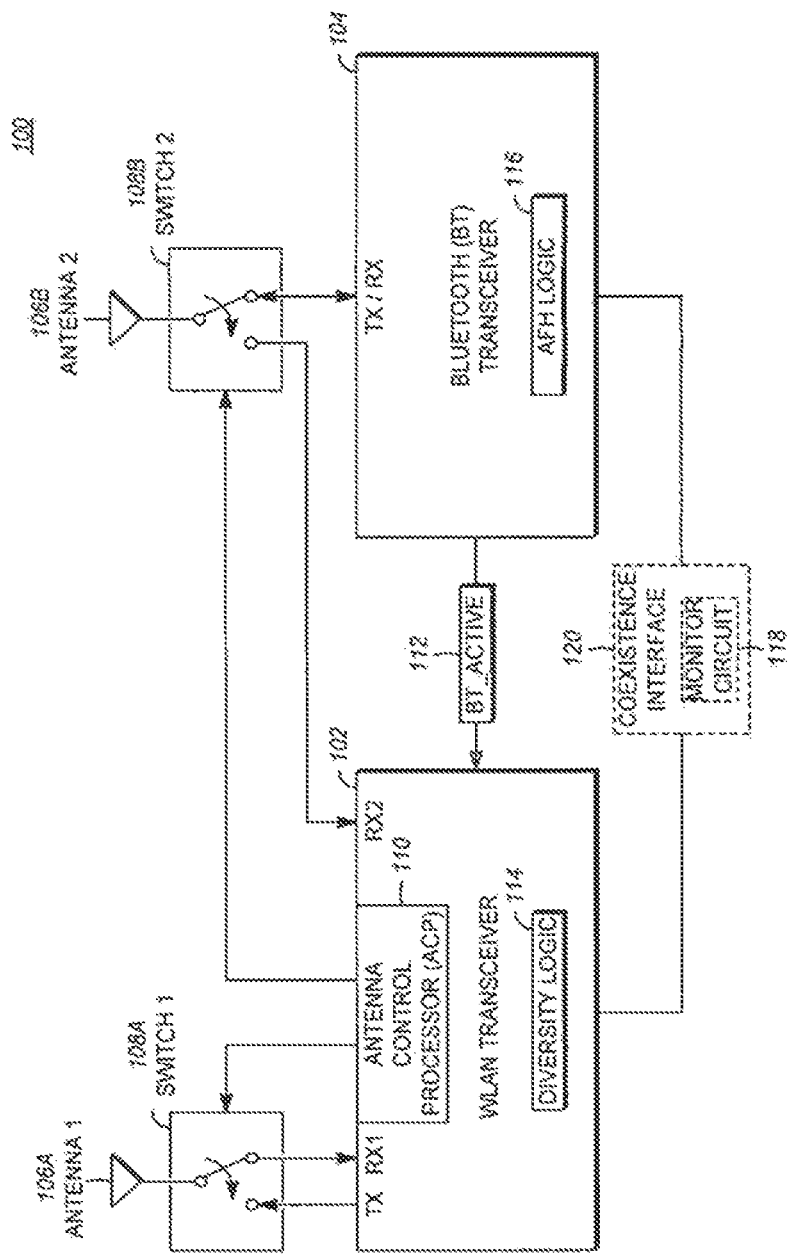
FIG. 1 is a block diagram of an example system including a dual antenna topology, according to an example embodiment.

FIG. 1 is a block diagram of an example system 100 for a dual antenna topology, according to an example embodiment. In the example of FIG. 1, the system 100 may coordinate and/or arbitrate access to one or more antennas shared between two or more radio devices/transceivers. This may allow for example, a first transceiver to transact (e.g., transmit and/or receive) wireless signals via either and/or both antennas, while the second radio device is idle or otherwise inactive, thus allowing the first radio device to benefit from diversity of different antenna options when transacting (e.g., receiving and/or transmitting) a wireless communication, thus improving the reliability and/or throughput of the transacted signals.

The system 100 may include a Wireless Local Area Network (WLAN) transceiver 102 configured to transmit and/or receive WLAN packets, frames, and/or other signals. The WLAN transceiver 102 may include for example a WiFi radio device configured to transmit and receive WLAN packets over one or more ports. The WLAN transceiver 102 may comprise suitable logic, circuitry and/or code to support WLAN protocol signals and/or packets for communication. As shown in the example of FIG. 1, the WLAN transceiver 102 may include a single port (e.g., Tx) for packet transmissions and two separate ports (e.g., Rx1 and Rx2) for packet receipt. In other example embodiments, the WLAN transceiver 102 may include additional and/or different ports, including for example a port configured for both WLAN packet transmission and reception. For example, the Rx2 port may be replaced with a Tx/Rx port whereby the WLAN transceiver 102 may be configured to transmit and receive WLAN signals via the Tx/Rx port.

The system 100 may include a Bluetooth (BT) transceiver 104 configured to transmit and/or receive BT packets, frames and/or other signals. The BT transceiver 104 may include for example a BT radio device. The BT transceiver 104 may comprise suitable logic, circuitry and/or code to support BT protocol signals and/or packets for communication. As shown in the example of FIG. 1, the BT transceiver 104 may include a single port for packet transmission and receipt (e.g., Tx/Rx). In other example embodiments, the BT transceiver 104 may include additional and/or different ports, including for example separate packet transmission and receipt ports.

Antenna 1 106A may include a broadband antenna. Antenna 1 106A may be configured to communicate via an Industrial, Scientific, Medical (ISM) band. For example, antenna 1 106A may be configured to receive and/or transmit packets across a channel within the 2.4-2.4835 GHz frequency band. In the example of FIG. 1, antenna 1 106A may include an antenna dedicated to the transmission and receipt of WLAN packets. In other example embodiments, antenna 1 106A may be configured to transmit and/or receive other protocol packets, such as BT packets in addition to and/or in lieu of the WLAN packets, similar to antenna 2 106B as discussed below.

Antenna 2 106B may be substantially similar to antenna 1 106A, except in that rather than being dedicated for use by a single radio device or transceiver, use of antenna 2 106B may be shared by two or more radios or transceivers. For example, the system 100 may be configured such that the WLAN transceiver 102 uses antenna 2 106B to receive WLAN packets and a BT transceiver 104 uses antenna 2 106B to transmit and/or receive BT packets. In other example embodiments antenna 2 may be configurable for different wireless transactions in addition to and/or different from those shown in the example system 100. For example, in another example embodiment, the WLAN transceiver 102 may use antenna 2 106B to transmit WLAN packets. An example of sharing a single antenna by two or more communication protocols may include the method and system for sharing a single antenna as described in U.S. patent application Ser. No. 11/143,378, filed Jun. 2, 2005, titled "Method and system for sharing a single antenna on platforms with collocated bluetooth and IEEE 802.11B/G devices," which is incorporated by reference herein for all purposes. Antenna 2 106B is located within the system 100 at a remote distance from antenna 1 106A, so that the two antennas have the possibility of being exposed to different electromagnetic spectra of the radiation they are adapted to receive. For example, antenna 2 106B can be located at a distance from antenna 1 106A that is more than half a wavelength of the radiation that the antennas are adapted to receive, so that antennas might be located in different interference nodes of the radiation. For example, antennas adapted to receive Bluetooth and WLAN signals having a frequency of about 2.4 GHz may be located at more than about 3 or 6 centimeters from each other. Thus, if antenna 1 is located in an anti-node of the radiation such that it receives a weak signal, antenna 2 might be located in a node and receive a stronger signal.

Switch 1 108A may include a device configured to change the course or flow of a circuit or other current. Switch 1 108A may be a single pole, dual throw (SPDT) switch. Switch 1 108A may be used for example, to determine whether antenna 1 106A is set to transmit or receive WLAN packets for processing by the WLAN transceiver 102. In the example of FIG. 1, switch 1 108A is shown in a position such that antenna 1 106A may be used by WLAN transceiver 102 to receive WLAN packets. When toggled however, switch 1 108A may allow the WLAN transceiver 102 to transmit WLAN packets via antenna 1 106A.

Switch 2 108B may be similar or substantially similar to switch 1 108A, and may also be a SPDT switch. Antenna 2 106B may be set either to transmit and receive BT packets or to receive WLAN packets dependent on the position of switch 2 108B. In the example of FIG. 1, switch 2 108B, as shown, is in a position such that the BT transceiver 104 may use antenna 2 106B to transmit and receive BT packets. In another possible position of the switch 2 108B evident from FIG. 1, the WLAN transceiver 102 may receive WLAN signals (or packets) via antenna 2 106B. In other example embodiments, switch 1 108A and/or switch 2 108B may include multiple throw and/or SPDT switches and may be used to set to different and/or additional antenna configuration options, and may include multiple switch settings (in addition to and/or different from the two shown in the example of FIG. 1).

An antenna control processor (ACP) 110 may determine and/or toggle switches to set the configuration of one or more antennas. For example, the ACP 110 may determine whether or not to activate and/or otherwise toggle the switches (106A and 106B), thus determining how antenna 1 106A and antenna 2 106B are configured to operate relative to the WLAN and BT transceivers (e.g., 102 and 104, respectively). For example, the ACP 110 may toggle switch 2 108B from its current position as shown in the example of FIG. 1 where antenna 2 106B is set to transact BT packets for processing by the BT transceiver 104, such that antenna 2 106B may be set to receive WLAN packets for processing by the WLAN transceiver 102.

The ACP 110 may control the state of switch 2 108B, based at least in part on a BT_ACTIVE signal 112. When the BT transceiver 104 is ready to transmit/receive and/or is transmitting/receiving one or more BT signals, it may assert the BT_ACTIVE signal 112. Then, when the BT transceiver 104 has completed the transmission/reception of one or more BT signals, the BT transceiver 104 may deassert the BT_ACTIVE signal 112. The BT_ACTIVE signal 112 may indicate (e.g., to the WLAN transceiver 102 and/or ACP 110) when the BT transceiver 104 is using and/or is ready to use antenna 2 106B to transact (e.g., transmit and/or receive) BT packets.

According to an example embodiment, the WLAN transceiver 102 may fast poll the BT transceiver 104 to determine whether the BT_ACTIVE signal 112 is being asserted. Then for example, the WLAN transceiver 102, upon determining that the BT_ACTIVE signal 112 is being asserted, may terminate (e.g., with an interrupt) and/or otherwise complete its current WLAN packet reception (via the Rx2 port). According to an example embodiment, the WLAN transceiver 102, after determining that the BT_ACTIVE signal 112 is present (or being asserted), may set a flag indicating that the BT transceiver 104 is currently active. Then for example, upon a determination that the BT_ACTIVE signal 112 is no longer present or being asserted, the WLAN transceiver 102 may begin receiving WLAN signals via antenna 2 106B (after switch 2 108B has been set for WLAN packet reception by the ACP 110).

As just referenced, the BT_ACTIVE signal 112 may include a signal asserted by the BT transceiver 104 which may be received or determined by the WLAN transceiver 102 (and/or ACP 110) to indicate that the BT transceiver 104 is ready to and/or is in the process of transacting one or more BT packets. For example, the BT transceiver 104 may transmit a first BT packet then wait for a period of time before transmitting a second packet. During transmission of the first packet, the BT transceiver 104 may generate, provide or otherwise assert the BT_ACTIVE signal 112, which may be determined or received by the WLAN transceiver 102 and/or the ACP 110. Then, for example, during the time period between transmissions, the BT transceiver 104 may discontinue, deactivate and/or otherwise de-assert the BT_ACTIVE signal 112. Then for example, during the time the BT_ACTIVE signal 112 is inactive or is de-asserted, the ACP 110 may toggle or otherwise activate switch 2 108B into a state wherein antenna 2 106B may be set to receive WLAN packets and provide the packets to the WLAN transceiver 102. Then for example, when the BT_ACTIVE signal 112 is asserted, the ACP 110 may toggle the switch 2 108B into a state whereby the antenna 2 106B may be set to transact BT packets and in which the antenna 2 106B does not provide signals to the WLAN transceiver 102.

According to an example embodiment, the BT_ACTIVE signal 112 may cause the WLAN transceiver 102 to set a signal, flag and/or interrupt. For example, when the WLAN transceiver 102 determines that the BT transceiver 104 is asserting the BT_ACTIVE signal 112, the WLAN transceiver 102 may set an interrupt which may cause the immediate cessation of the receipt of any WLAN signals by the WLAN transceiver 102 via antenna 2 106B. Or for example, a determination of an asserted BT_ACTIVE signal 112 may cause the WLAN transceiver 102 to set a flag indicating the assertion of the BT_ACTIVE signal 112. The status of the flag may cause the ACP 110 to toggle switch 2 108B such that the antenna 2 106B may either be set to receive WLAN packets or transmit/receive BT packets. For example, a set flag may cause the ACP 110 to set the switch 2 108B, as shown in the example of FIG. 1, to the BT transceiver 104. In another example embodiment the ACP 110 may directly determine whether the BT_ACTIVE signal 112 is being asserted.

The BT_ACTIVE signal 112 may be associated with a guard time. The guard time may include a time period by which the WLAN transceiver 102 is to terminate and/or complete the current signal receipt (if any) and the ACP 110 is to toggle switch 2 108B such that antenna 2 106B is set to BT transceiver 104. For example, the guard time may be 0.02 ms. Then for example, upon a determination of an asserted BT_ACTIVE signal 112, the ACP 110 is to toggle switch 2 108B within 0.02 ms such that antenna 2 106B is set to transact BT packets. Then for example, the WLAN transceiver 102 may store the status of the WLAN packet receipt at the expiration of the guard time, such that the WLAN transceiver 102 may make a determination on how to proceed with WLAN packet processing based at least in part on the status. For example, the WLAN packet receipt via antenna 2 106B may be terminated prior to the receipt of a complete WLAN packet. Then for example, the WLAN transceiver 102 may determine that the WLAN packet from antenna 1 106A should be used and that diversity should not be implemented with the incomplete packet (as received via antenna 2 106B).

According to an example embodiment, the BT_ACTIVE signal 112, the BT transceiver 104 and/or the WLAN transceiver 102 may be associated with priorities such that upon a determination of an asserted BT_ACTIVE signal 112, the system 100 (e.g., the BT transceiver 104, ACP 110 and/or WLAN transceiver 102) may compare the relative priorities associated with the WLAN transceiver 102 and/or the BT transceiver 104 to determine which transceiver gets access to the antenna 2 106B.

For example, if the BT transceiver 104 transmits and/or receives BT voice packets that do not include error correction or retransmit capability, then the transmission and reception of the BT voice packets may include or be provided with the highest priority, wherein upon receipt of the BT_ACTIVE signal 112, the ACP 110 may immediately toggle switch 2 108B to set antenna 2 106B to BT transceiver 104 so as to avoid packet dropping and/or other errors associated with the transmission and/or receipt of BT voice packets. The ACP 110 and/or the WLAN transceiver 102 may, for example, interrupt the current WLAN transaction upon determination of an asserted BT_ACTIVE signal 112. In other example embodiments, the ACP 110 may not toggle switch 2 108B to receive WLAN signals if a priority associated with the BT signals is high enough.

According to another example embodiment, the BT transceiver 104 may transmit and/or receive BT data packets that are configured with error correction. For example, unlike BT voice packets which may need to be transmitted in real-time, BT data packets may be able to be buffered and thus may include error correction not included with BT voice packets. Then for example, the BT data packets may be associated with a lower priority than BT voice packets and/or some WLAN transceiver 102 transmission/receipt functions. Then for example, upon determination of the BT_ACTIVE signal 112, the priority of a competing WLAN packet to be received may be compared with the priority associated with the BT data packet, and the BT transceiver 104 may be, at least temporarily, denied access to antenna 2 106B based on a higher priority associated with a WLAN packet being transacted.

When both antenna 1 106A and antenna 2 106B are set to transact WLAN packets, the WLAN transceiver 102 may apply diversity (using diversity logic 114) to transact the WLAN packets. For example, the WLAN transceiver 102 may receive WLAN packets via both antenna 1 106A and antenna 2 106B, whereby the diversity logic 114 may be applied to the received packets.

The diversity logic 114 may include logic configured to apply, perform, implement or otherwise employ a diversity scheme with transacted WLAN packets, such as receive diversity on received WLAN signals. Receive diversity may include an algorithm or scheme for improving reliability of a message or signal by utilizing two or more communication channels with different characteristics. Diversity, including receive diversity, may combine the signals received via two or more antennas to account for different signal strength on each antenna and/or different phases of the signal at the different antenna. For example, receive diversity, as employed by the diversity logic 114 may utilize both antenna 1 106A and antenna 2 106B, whereby the two antennas are physically located in different locations. The different locations may result in antenna 1 106A and antenna 2 106B receiving identical signals from the same source, however the signals, as received by the different antennas, may have different strengths or phases because of the different locations of the antennas. For example, one antenna may be located at a node of the signal while another antenna may be located at an anti-node. Then for example, the WLAN transceiver 102 may then use diversity logic 114 to receive a stronger and/or more reliable signal or packet.

Receive diversity may include selection diversity and/or combination diversity. Selection diversity may include multiple versions of the same signal being received, whereby the stronger signal may be selected. In the example of FIG. 1, with selection diversity, both antenna 1 106A and antenna 2 106B (when set to receive WLAN packets) may receive the same or similar WLAN signals. Then for example, diversity logic 114 may determine which of the packets are stronger and/or more reliable and may opt to receive the stronger signal in lieu of the other weaker signal.

With combination diversity, a first portion of a first WLAN packet may be received by antenna 1 106A and a second portion of the first WLAN signal may be received by antenna 2 106B. Diversity logic 114, may then for example, combine the first portion from antenna 1 106A and the second portion of the signal from antenna 2 106B to result in a receipt of the first WLAN packet.

While the diversity logic 114 is referred to mainly in the context of receiving packets over two or more antennas, it is to be appreciated that the diversity logic 114 may also be applied in transmitting packets over two or more antennas.

For example, the WLAN transceiver 102 may be configured to transmit and receive via both antenna 1 106A and antenna 2 106B. Then for example, when both switch 1 108A and switch 2 108B are set to allow the WLAN transceiver 102 to transmit WLAN packets (e.g., when the BT_ACTIVE signal 112 is not being asserted), then the WLAN transceiver 102 may use the diversity logic 114 to transmit WLAN packets via antenna 1 106A and antenna 2 106B using selection and/or combination diversity during the transmissions.

According to an example embodiment, the WLAN transceiver 102 and the BT transceiver 104 may be installed in close proximity to one another. For example, WLAN transceiver 102 and the BT transceiver 104 may be installed on a circuit board of a telephony and/or network device, such as, for example, a laptop or desktop computer. As discussed above, antenna 1 106A and antenna 2 106B may include broadband antennas configured to receive signals and/or energy across a wide spectrum (e.g., between 2.4-2.5843 GHz). Then for example, if the BT transceiver 104 is transmitting BT packets via antenna 2 106B while the WLAN transceiver 102 is receiving WLAN packets via antenna 1 106A, antenna 1 106A may receive at least a portion of the energy associated with the transmission of the BT packets via antenna 2 106B. The receipt of the BT signal(s) at antenna 1 106A (e.g., the antenna receiving WLAN packets) may result in the desensitization of the WLAN transceiver 102 to WLAN signals (i.e., receiver desensitization).

Receivers may be configured to receive both strong and weak signals based for example on a baseline signal strength. The further below the baseline signal strength an incoming signal is (i.e., the weaker the incoming signal), the more likely the signal is to be interpreted as noise (i.e., unintentionally received energy) and discarded. If for example, over time the receiver receives very strong signals, then the baseline signal strength of the receiver may recalibrate and increase, or for example if the receiver was to receive very weak signals, the baseline signal strength may likewise fall.

If a transmitter and a receiver are placed in close proximity to one another, then there may be an increased likelihood that the receiver will receive at least a portion of the energy emitted by the transmitter during transmission. This unintentional energy reception may result in the receiver becoming desensitized and the baseline signal strength increasing. Then for example due to the increased baseline signal strength, the receiver may be unable to distinguish between a weak signal from the intended source or transmitter and the strong unintentional noise reception from the proximate or unintentional transmitter.

In the example of FIG. 1, when the BT transceiver 104 is transmitting while the WLAN transceiver 102 is receiving, if there is not enough isolation between the BT transceiver 104 and the WLAN transceiver 102, then the WLAN transceiver 102 may receive and become overwhelmed by the BT signal (e.g., energy received from the BT transmission(s) by the BT transceiver 104) and may become desensitized to the WLAN signal that it is trying to receive. Consequently, the signal transmission and receipt functions between the WLAN transceiver 102 and BT transceiver 104 may be arbitrated to prevent or otherwise reduce the likelihood of receiver desensitization.

Greater isolation between two or more radios or transceivers may be achieved for example by increasing the distance between a transmitter and receiver, and by employing shielding and/or controlling the polarization of the two signals emitted by the two antennas. If sufficient isolation is achieved between the WLAN transceiver 102 and BT transceiver 104, then for example, the transmissions and receptions between the WLAN 102 and BT transceiver 104 may not have to be arbitrated (i.e., one transceiver need not be prevented from receiving signals while the other is transmitting signals, or vice versa) to avoid receiver desensitization.

If sufficient isolation is achieved, then for example, the BT transceiver 104 may employ adaptive frequency hopping (AFH) without additional arbitration. AFH logic 116 may be configured to avoid collisions between the transmissions and/or receipt of packets between a BT radio and another radio or transceiver. For example, the AFH logic 116 may be employed by the BT transceiver 104 to avoid collisions between the transmission/receipt of BT packets and the transmission/receipt of WLAN packets.

A collision (or interference) may occur for example when two or more radios/transceivers are attempting to transmit and/or receive packets within the same frequency band. For example, as discussed above, the antennas (106A and 106B) may be broadband antennas capable of transmitting/receiving packets across a wide 2.4-2.5 GHz frequency. Then, for example, of the potentially available 100 MHz, a first radio may only need a specified 20 MHz on which to transmit/receive packets. If however, a second radio transmits and/or receives packets within the same 20 MHz frequency band being used by the first radio, then interference or collisions may occur.

The AFH logic 116 may be configured to avoid such collisions/interference for example, by determining whether a frequency band is occupied before transacting (e.g., transmitting and/or receiving) packets. For example, the AFH logic 116 may listen for background noise on different potential transmission channels (or bands) and choose the channel with the lowest noise on which to transmit and/or receive packets. Then for example, if the AFH logic 116 determines that a frequency band is occupied (e.g., by the WLAN transceiver 102), it may "hop" to the next available frequency band (e.g., next channel with lowest noise) before transmitting/receiving packets, thus avoiding collisions/interference.

As discussed above, if sufficient isolation is not achieved between the WLAN transceiver 102 and the BT transceiver 104 then the transactions by the receivers may be arbitrated to avoid receiver desensitization and if sufficient isolation is achieved then a system may be able to implement AFH only (e.g., without arbitration). However, in example embodiments, it may be difficult to determine ahead of time (e.g., prior to building at least a prototype of an embodiment), whether sufficient isolation will exist between a WLAN transceiver and BT transceiver (e.g., 102 and 104, respectively). A system (e.g., 100) however may be implemented into a prototype whereby the decision whether or not to implement arbitration may be made after the system is designed and built, as the logic associated with arbitration and/or AFH may be software based, thus allowing a manufacturer in greater flexibility in system design.

In other example embodiments where it may be difficult to determine whether sufficient isolation exists to prevent receiver desensitization, an embodiment may be configured to operate with an acceptable amount of desensitization, and/or an embodiment may perform some functions that are better suited to the system (e.g., 100) implementing AFH logic 116 only (e.g., where isolation is found to be sufficient) and other functions that are better suited to the system implementing both arbitration and AFH logic 116 (e.g., when isolation may be insufficient). In these example embodiments, a host processor (not shown) may determine and/or switch between implementing AFH logic 116 and/or arbitration.

For example, with WLAN web browsing, file transfer protocol (FTP) and/or BT synchronization (e.g., of an address book and calendar on a personal digital assistant (PDA)), an embodiment may tolerate some desensitization and packet loss and still achieve better averaged throughputs with AFH only than with using arbitration, even though there may be occasional packet loss that may require retransmission of either or both BT and WLAN packets. In other situations, that may require minimal packet loss or low latency (e.g., voice-over WLAN, voice-over BT, or Synchronous Connection Oriented ("SCO") link BT communications), maximizing averaged throughput may not be as important as avoiding collisions between BT and WLAN packets to avoid packet loss and retransmission. In such cases arbitration may be used in addition to or instead of AFH logic 116. Then, for example, the host processor may determine when to implement AFH only and when to implement arbitration (with or without AFH). This determination may then be received by a monitor circuit 118.

The monitor circuit 118 may receive a determination about whether to implement AFH only or arbitration (with or without AFH) and may provide the determination to the coexistence interface 120. For example, as discussed above, a host processor may, based on a determination either that there is enough isolation between a transmitter and receiver such that the likelihood of receiver desensitization occurring is acceptable and/or that the function at hand would benefit greater from operating with or without arbitration, provide the monitor circuit 118 with a determination as to whether or not to employ arbitration. Then for example, the host processor may later change the determination (e.g., whether or not to implement arbitration) and the system 100 may respond accordingly.

In the example of FIG. 1, if it is determined that sufficient isolation exists between the WLAN transceiver 102 and BT transceiver 104, then so long as they have access to an available antenna (via the switches 1 108A and 2 108B), either transceiver (e.g., 102 or 104) may transmit and/or receive packets independent of the other without needing to account for the potential receiver desensitization of the other transceiver. Furthermore, the AFH logic 116 may prevent, avoid or otherwise minimize collisions between the packets being transmitted and/or received by the two transceivers. However, even in the case of sufficient isolation, arbitration of the use of antenna 2 106B may still be implemented during the times when BT transceiver 104 is not transacting BT packets (e.g., as indicated by the BT_ACTIVE signal 112), so that the WLAN transceiver 102 may take advantage of the available antenna 2 106B and implement diversity with the WLAN packets received via both antennas, as discussed above.

If however, sufficient isolation is not achieved between the WLAN transceiver 102 and the BT transceiver 104 such that potential receiver desensitization may be an issue, then the coexistence interface 120 may arbitrate the transmission and/or receipt functions between the two transceivers. Insufficient isolation, as discussed above, may result in receiver desensitization. To prevent and/or minimize the likelihood of receiver desensitization, the coexistence interface 120 may arbitrate access to the antennas (106A and 106B), such that a first transceiver may not transmit packets while a second transceiver is receiving packets, and/or vice versa. For example, the coexistence interface 120 may prevent the BT transceiver 104 from transmitting BT packets via antenna 2 106B while the WLAN transceiver 102 is receiving WLAN packets on antenna 1 106A, and/or vice versa. The arbitration may then prevent a transceiver from receiving the energy emitted by the other transceiver during transmission by for example assigning time slots to when either transceiver may transmit and/or receive packets.

With arbitration, during the time the WLAN transceiver 102 is receiving WLAN packets via antenna 1 106A, the BT transceiver 104 may be prevented from transmitting BT packets via antenna 2 106B. Then if the BT transceiver 104 has no BT packets to receive during that time, the WLAN transceiver 102 may be provided access to antenna 2 106B (e.g., the ACP 110 may toggle switch 2 108B), so that the WLAN transceiver 102 may receive packets via both antennas and perform diversity.

In another example embodiment, the coexistence interface 120 may prevent the WLAN transceiver 102 from transmitting packets while the BT transceiver 104 is receiving BT packets, or vice versa. Then for example, while BT transceiver 104 is receiving BT packets via antenna 2 106B, the WLAN transceiver 102 may receive WLAN packets via antenna 1 106A. An example of the coexistence interface 120 may include a 3-wire coexistence interface 120, described in U.S. patent application Ser. No. 11/143,559, filed Jun. 2, 2005, titled "Method and system for achieving enhanced quality and higher throughput for collocated IEEE 802.11B/G and bluetooth devices in coexistent operation," which is incorporated by reference herein for all purposes. Also, as discussed above, if the WLAN transmitter 102 is transmitting via antenna 1 106A and the BT transceiver 104 has nothing to transmit, then the WLAN transmitter 102 may transmit via both antennas using diversity.

If sufficient isolation is not achieved, the WLAN transceiver 102 and the BT transceiver 104 may both simultaneously transmit packets or may both simultaneously receive packets, without receiver desensitization occurring. This may be regulated for example by the coexistence interface 120. According to an example embodiment, during the periods when both transceivers are transmitting, the BT transceiver 104 may employ the AFH logic 116 to further help avoid collisions/interference. As referenced above, the BT transceiver 104 (using AFH logic 116) may determine a frequency band with the lowest background noise and transmit on that frequency, which may allow a BT receiver to receive a signal with a high signal-to-noise ratio.

While the example of FIG. 1 is shown such that only antenna 2 106B may be shared between the WLAN transceiver 102 and the BT transceiver 104, it may be appreciated however that the example system of FIG. 1, is only one of several example embodiments. For example, in other example embodiments (which may include additional switches), both antenna 1 106A and antenna 2 106B may be shared between the two transceivers (e.g., 102 and 104) whereby both transceivers may perform transmission and/or receipt functions (which may or may not be arbitrated between transmissions and receipt based on isolation and/or a function or type of packet being received, as discussed above). Then for example, if the BT transceiver 104 requests access to an antenna, the WLAN transceiver 102 and/or the ACP 110 may provide the BT transceiver 104 access to the antenna over which the WLAN transceiver 102 is receiving the weaker signal. Also other alternative embodiments may include additional transceivers, switches and/or antennas.

While the system 100 is adaptable to include more than just the two antennas shown (e.g., antenna 1 106A and antenna 2 106B) to be shared between the WLAN transceiver 102 and BT transceiver 104 (and even one or more other transceivers), only two antennas are included in the system 100 due to constraints that may arise during the implementation of system 100 in one or more devices. For example, the system 100 may be implemented in portable network electronics, such as a laptop. In such electronics it may be desirable to limit the number of antennas to two, not only for power consumption reasons (as more antennas may result in greater power consumption), but also for physical space limitations because in modern electronics, smaller devices with fewer components may be more desirable than larger devices.

As just referenced, the system 100 may allow for the WLAN and BT transceivers (e.g., 102 and 104 respectively) to share two or more antennas, thus allowing the WLAN transceiver 102 to employ diversity during the receipt and/or transmission of packets via both antennas during those times the BT transceiver 104 may be idle and/or have a relatively low BT signal priority. The WLAN transceiver 102 may be able to determine the activity and/or priority based on a signal (e.g., BT_ACTIVE signal 112), flag or interrupt provided, set or otherwise asserted by the BT transceiver 104 during those times when the BT transceiver 104 is requesting access or currently using a shared antenna. Through the use of a coexistence interface 120, the system 100 may further be able to defend against potential receiver desensitization.

Figure 2:
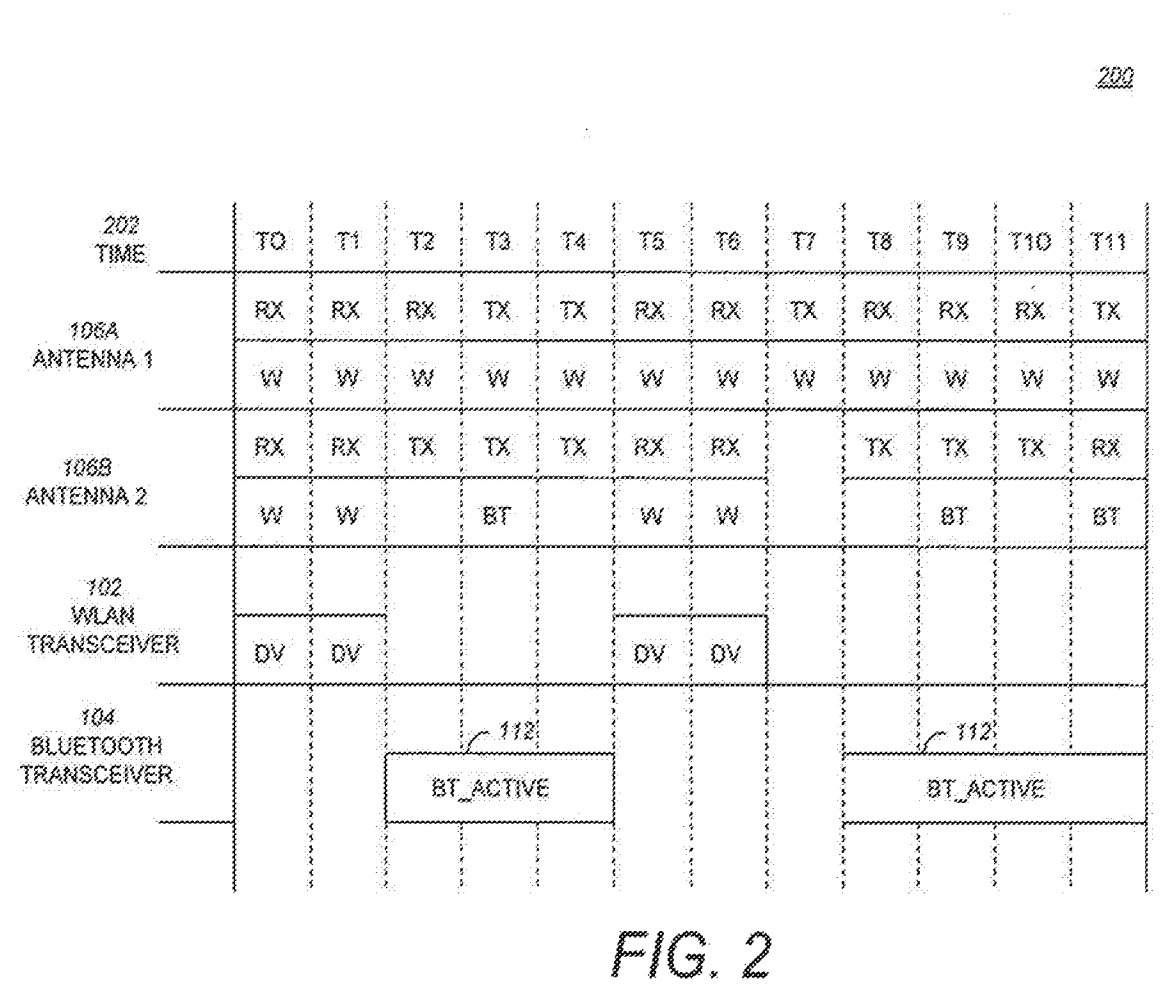

FIG. 2 is a timing diagram 200 that illustrates an exemplary communication of the system 100 of FIG. 1 according to an example embodiment. While FIG. 2 illustrates an example timing diagram 200 representing example operations related to the system 100 of FIG. 1, it should be appreciated however that the timing diagram 200 is not limited to the example of system 100 and may be applied to other systems. It may also be appreciated that different systems, including the system 100, may have other timing diagrams in addition to and/or in lieu of the timing diagram 200. For example, other systems may employ different protocols in addition to and/or in lieu of the WLAN and Bluetooth (BT) protocols.

Referring to FIG. 2, the WLAN transceiver 102 may be configured to transmit and receive WLAN packets over antenna 1 106A and only receive WLAN packets via antenna 2 106B, whereby the BT transceiver 104 may be configured to transmit and receive BT packets only over antenna 2 106B. As discussed above, during the time period when the WLAN transceiver 102 is receiving WLAN packets over both antennas (e.g., antenna 1 106A and antenna 2 106B), the WLAN transceiver 102 may employ receipt diversity to improve the likelihood of the receipt of an accurate and/or stronger signal. Also, in the example diagram 200, it may be appreciated that sufficient isolation exists such that receiver desensitization is not an issue is assumed, however in other example embodiments, such sufficient isolation may not exist.

In the example of FIG. 2, time 202 may represent blocks of time, periods of time, durations and/or other timing measurements associated with tracking transactions (e.g., transmissions and receipts). For example, T0 may represent the block of time (e.g., duration) required to receive a WLAN packet.

During time T0 and T1, the WLAN transceiver 102 may have access to both antenna 1 106A and antenna 2 106B, thus may receive WLAN packets during the time T0-T1, and during this time period the WLAN transceiver 102 may perform diversity (e.g., DV), such as selection diversity, and receive the WLAN packet received via the stronger antenna.

During time T2, the BT transceiver 104 may assert the BT_ACTIVE signal 112 (or set a BT_ACTIVE flag, or interrupt) which may be received or otherwise detected by the WLAN transceiver 102 (and/or ACP 110). Then for example, access to antenna 2 106B may be transferred from the WLAN transceiver 102 to the BT transceiver 104. As discussed above, the BT_ACTIVE signal 112 may be associated with a guard time within which to complete and/or terminate the WLAN activity. The guard time, may include for example, a guard time of 0, in which case the ACP 110 and/or the WLAN transceiver 102 may immediately terminate whatever WLAN packet reception is being performed by the WLAN transceiver 102 and transfer access to the BT transceiver 104.

During the time period T2, the WLAN transceiver 102 may receive a WLAN packet via antenna 1 106A and the BT transceiver 104 may begin to transmit a BT packet via antenna 2 106B. Because during the time period T2, the WLAN transceiver 102 is only receiving via a single antenna, the WLAN transceiver 102 may no longer perform diversity during the receipt of WLAN packets.

During the time T3-T4, both the WLAN transceiver 102 and the BT transceiver 104 may be transmitting packets, the WLAN transceiver 102 via antenna 1 106A and the BT transceiver 104 via antenna 2 106B, whereby the BT_ACTIVE signal 112 may still be active or asserted.

During the time T5, when the BT_ACTIVE signal 112 is no longer active, access to antenna 2 106B may be restored to the WLAN transceiver 102 which may begin receiving WLAN packets over both antennas and perform diversity.

During the time period T11, the BT transceiver 104 may be receive a BT packet, during which time the BT_ACTIVE signal 112 may remain active or in other example embodiments a new second BT_ACTIVE receipt signal may be provided by the BT transceiver 104. Also, during the time period T11, the WLAN transceiver 102 may be transmitting a WLAN packet.

In those example embodiments where sufficient isolation is not achieved between the WLAN transceiver 102 and the BT transceiver 104, it may be appreciated that during a given time 202, for example T2, WLAN transceiver 102 may be prevented from receiving a WLAN packet via antenna 1 106A while BT transceiver 104 is transmitting a BT packet via antenna 2 106B, or vice versa.

Although not shown in the example system 200, it may be understood that WLAN packet transactions may occur in pairs of transmission/receipt and/or receipt/transmission. For example, upon receipt of a WLAN packet via antenna 1 106A from a WLAN station, the WLAN transceiver 102 may transmit an acknowledgement (ACK) packet back to the station that transmitted the WLAN packet within a short interframe space (SIFS) between transmissions by the station. In BT transmissions it may be understood that a master-slave relationship may exist between the BT transceiver 104 and another BT device, in which case, the slave may only transmit to the master when addressed by the master, but the master may freely transmit to the slave. Also, it should be appreciated that the relative transmission and receipt durations of the BT and WLAN packets as shown in FIG. 2 are exemplary only, and that packet transmission and/or receipt durations may vary.

Figure 3:
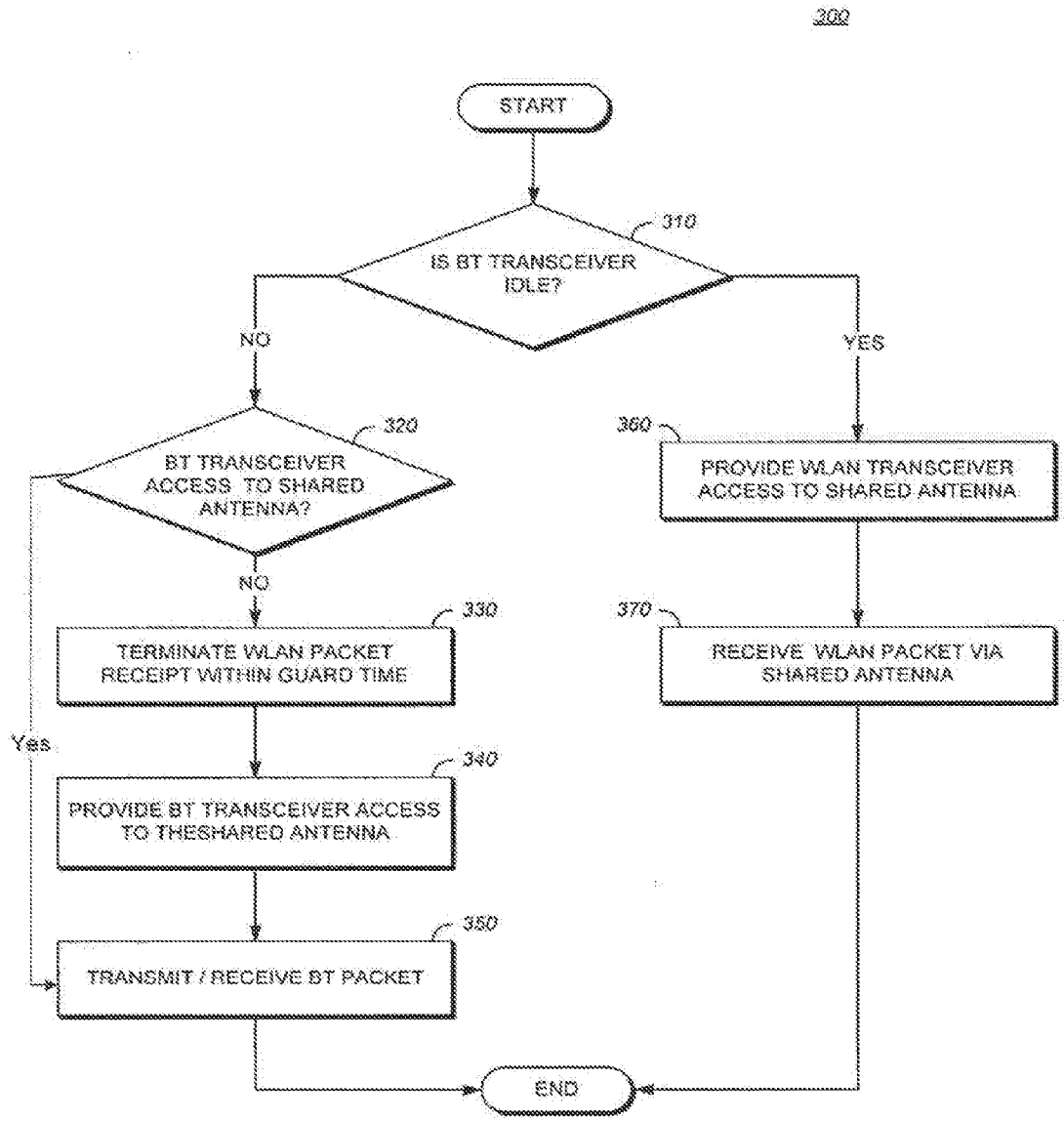
FIG. 3 is a flowchart illustrating example operations of the system of FIG. 1.

FIG. 3 is a flowchart 300 illustrating example operations of the system of FIG. 1. More specifically, FIG. 3 illustrates an operational flow 300 representing example operations related to a dual antenna topology. While FIG. 3 illustrates an example operational flow 300 representing example operations related to the system 100 of FIG. 1, it should be appreciated however that the operational flow 300 is not limited to the example of system 100 and may be applied to other systems.

After a start operation, at block 310, it may be determined whether the Bluetooth (BT) transceiver is idle. For example, in FIG. 1, antenna control processor (ACP 110) may determine whether the BT transceiver 104 is idle based on whether the BT_ACTIVE signal 112 is being transmitted or otherwise asserted by the BT transceiver 104. If for example, the BT_ACTIVE signal 112 is being asserted by the BT transceiver 104 then that may indicate the BT transceiver 104 is not idle (e.g., transacting or ready to transact BT packets).

At block 320, if the BT transceiver is not idle, it may be determined whether the BT transceiver 104 has access to a shared antenna. For example, ACP 110 may determine whether or not switch 2 108B is set such that antenna 2 106B is set to transact (e.g., transmit and/or receive) BT packets.

At block 330, if the BT transceiver does not have access to the shared antenna, the WLAN packet receipt may be terminated within a guard time. For example, if the switch 2 108B is set to receive WLAN packets, then the WLAN transceiver 102 and/or ACP 110 may terminate the WLAN packet receipt within the guard time associated with the BT_ACTIVE signal 112. In other example embodiments a WLAN packet transmission may be completed within the guard time.

At block 340, the BT transceiver may be provided access to the shared antenna. For example, the ACP 110 may activate or otherwise toggle switch 2 108B such that antenna 2 106B is set to transmit/receive BT packets. According to an example embodiment, the termination of a WLAN packet receipt at block 330 and providing access to the shared antenna (e.g., antenna 2 106B) to the BT transceiver 104 may both be done within the guard time.

At block 350, once it is determined that the BT transceiver has access to the shared antenna, a BT packet may be transmitted or received via the shared antenna. For example, BT transceiver 104 may transmit and/or receive a BT packet via antenna 2 106B, during which time the BT transceiver 104 may assert the BT_ACTIVE signal 112.

If it is determined at block 310 that the BT transceiver 104 is idle, then, at block 360, the WLAN transceiver may be provided access to the shared antenna. For example, the BT transceiver 104 may not be transacting BT packets (e.g., is at least temporarily inactive or idle as indicated by a deasserted BT_ACTIVE signal 112), then the ACP 110 may activate switch 2 108B such that antenna 2 106B is set to receive WLAN packets for WLAN transceiver 102.

At block 370, a WLAN packet may be received via the shared antenna. For example, the WLAN transceiver 102 may receive a packet via antenna 2 106B. The WLAN transceiver 102 may also receive a WLAN packet via antenna 1 106A and perform diversity on the packets received via the two antennas. The diversity may include diversity as performed by the diversity logic 114, including selection diversity where the stronger of two or more signals is selected for receipt. In other example embodiment, the WLAN transceiver 102 may perform diversity while transmitting one or more WLAN packets via antenna 1 106A and antenna 2 106B.

Figure 4:
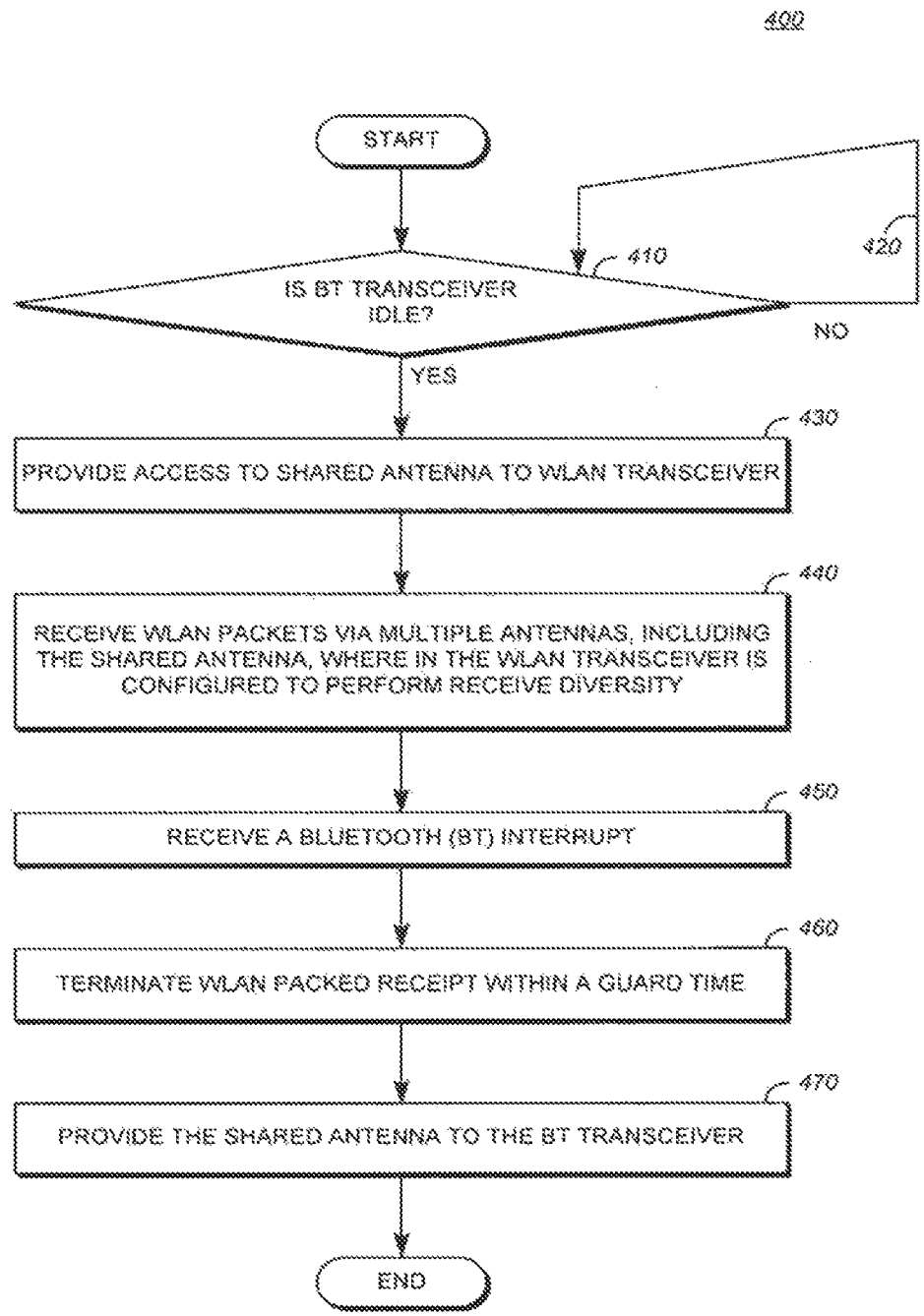
FIG. 4 is a flowchart illustrating example operations of the system of FIG. 1.

FIG. 4 is a flowchart 400 illustrating example operations of the system of FIG. 1. More specifically, FIG. 4 illustrates an operational flow 400 representing example operations related to a dual antenna topology. While FIG. 4 illustrates an example operational flow 400 representing example operations related to the system 100 of FIG. 1, it should be appreciated however that the operational flow 400 is not limited to the example of system 100 and may be applied to other systems.

After a start operation, at block 410, it may be determined whether the Bluetooth (BT) transceiver is idle. For example, in FIG. 1, antenna control processor (ACP 110) and/or WLAN transceiver 102 may determine whether the BT_ACTIVE signal 112 is being asserted by the BT transceiver 104, or whether a BT_ACTIVE flag has been set, to determine whether or not the BT transceiver 104 is idle whereby a receipt or other determination of an asserted BT_ACTIVE signal 112 may indicate that the BT transceiver 104 is not idle.

If the BT transceiver is not idle, then at block 420 the BT transceiver may be checked again until it is found to be idle. For example, if the BT transceiver 104 is not idle (e.g., the BT transceiver 104 is transacting and/or is ready to transact BT packets), then the BT transceiver 104 may transmit or receive a BT packet. Then for example, the ACP 110 and/or WLAN transceiver 102 may check again whether the BT_ACTIVE signal 112 is still being transmitted or otherwise asserted.

Upon a determination that the BT transceiver is idle, at block 430, the WLAN transceiver may be provided access to a shared antenna. For example, the ACP 110 may activate switch 2 108B and provide the WLAN transceiver 102 access to receive WLAN packets via antenna 2 106B.

At block 440, WLAN packets may be received via multiple antennas, including the shared antenna, wherein the WLAN transceiver is configured to perform receive diversity. For example, the WLAN transceiver 102 may receive WLAN packets via antenna 1 106A and antenna 2 106B whereby the WLAN transceiver 102 may be configured to employ diversity logic 114 to perform receive (e.g., selection and/or combination) diversity on received WLAN packets. In other example embodiments, the WLAN transceiver 102 may transmit WLAN packets via the multiple antennas, including the shared antenna using transmit diversity.

At block 450, a Bluetooth (BT) interrupt may be received. For example, the WLAN transceiver 102 may receive or otherwise determine the BT_ACTIVE signal 112 associated with the BT transceiver 104 is being asserted, which may indicate that the BT transceiver 104 is ready to receive and/or transmit a BT packet. Then for example, the WLAN transceiver 102 may set an interrupt in response to determining an assertion of the BT_ACTIVE signal 112.

At block 460, a WLAN packet receipt may be terminated within a guard time. For example, upon determination of the BT_ACTIVE signal 112, the WLAN transceiver 102 and/or ACP 110 may terminate a (current) WLAN packet receipt (or transmission) via antenna 2 106B within a guard time. The WLAN transceiver 102 may store the status of the WLAN packet receipt (or transmission) prior to or at termination, so that upon being provided access to antenna 2 106B again or upon establishing a WLAN connection via antenna 1 106A, the WLAN transceiver 102 may pick up the reception (or transmission) where it previously left off. As discussed above, the WLAN transaction may be terminated with an interrupt.

At block 470, the shared antenna may be provided to the BT transceiver. For example, the ACP 110 may activate or otherwise toggle switch 2 108B whereby antenna 2 106B is set such that the BT transceiver 104 may transmit and/or receive BT packets via antenna 2 106B.

Figure 5:
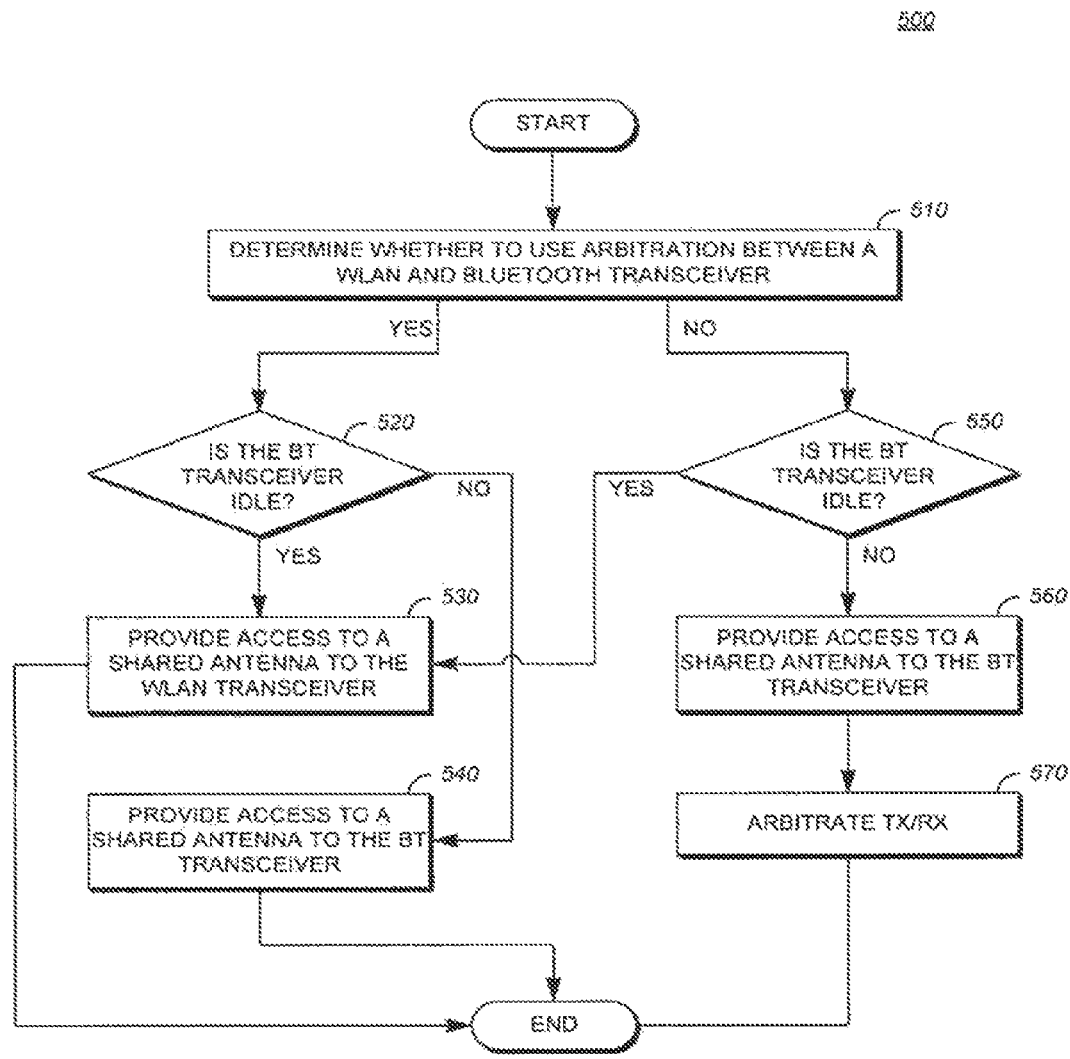
FIG. 5 is a flowchart illustrating example operations of the system of FIG. 1.

FIG. 5 is a flowchart 500 illustrating example operations of the system of FIG. 1. More specifically, FIG. 5 illustrates an operational flow 500 representing example operations related to a dual antenna topology. While FIG. 5 illustrates an example operational flow 500 representing example operations related to the system 100 of FIG. 1, it should be appreciated however that the operational flow 500 is not limited to the example of system 100 and may be applied to other systems.

After a start operation, at block 510, it may be determined whether to use arbitration between a WLAN and a BT transceiver. In FIG. 1, the monitor circuit 118 may determine and/or receive a determination from a host processor (not shown) as to whether or not to use arbitration between the transceivers. For example, an embodiment may have sufficient isolation to work with or without arbitration. Then for example, based on the function(s) the embodiment may be performing, a host processor and/or the monitor circuit 118 may determine whether or not to use arbitration.

In another implementation, whether or not to perform arbitration may be based on what function(s) the system 100 is performing. For example, as discussed above, BT voice packets may require real-time delivery and minimal, if any, error correction in which case arbitration may not be desired due to the potential for lost BT packets.

If is determined that arbitration is not to be used, then, at block 520, it may be determined whether the BT transceiver is idle. For example, the WLAN transceiver 102 and/or the ACP 110 may determine whether the BT transceiver 104 is idle based on an assertion of the BT_ACTIVE signal 112. For example, the BT transceiver 104 may assert the BT_ACTIVE signal 112 when the BT transceiver 104 is active (e.g., transacting and/or is ready to transact one or more BT packets).

If the BT transceiver is idle, then, at block 530, access to a shared antenna may be provided to the WLAN transceiver. For example, the ACP 110 may activate or otherwise toggle switch 2 108B, such that the WLAN transceiver 102 may receive WLAN packets via the antenna 2 106B.

If however the BT transceiver is not idle, then, at block 540, access to a shared antenna may be provided to the BT transceiver. For example, the ACP 110 may toggle switch 2 108B such that the BT transceiver 104 may transmit and/or receive BT packets via antenna 2 106B. If the BT transceiver 104 already has access to the shared antenna, then the BT transceiver 104 retains access.

If it is determined that arbitration is to be used, then at block 550 it may be determined whether the BT transceiver is idle. For example, similar to block 520, the WLAN transceiver 102 and/or the ACP 110 may determine whether or not the BT transceiver 104 is idle (e.g., at least temporarily inactive) based at least in part on the BT_ACTIVE signal 112.

If the BT transceiver is determined to be idle at block 550, then at block 530 access to a shared antenna may be provided to the WLAN transceiver. For example, the ACP 110 may activate switch 2 108B, such that the WLAN transceiver 102 may receive WLAN packets via the antenna 2 106B, as discussed above.

If however, the BT transceiver is not idle, then at block 560 access to a shared antenna may be provided to the BT transceiver. For example, the ACP 110 may terminate a current WLAN packet reception via antenna 2 106B and activate or toggle switch 2 108B to set antenna 2 106B to transmit/receive BT packets, within a guard time.

At block 570, transmissions and receipt functions may be arbitrated between the WLAN transceiver and BT transceiver. For example, the coexistence interface 120 may arbitrate transactions by the WLAN transceiver 102 and the BT transceiver 104, such that one transceiver may not receive packets while the other is transmitting packets.

Figure 6:
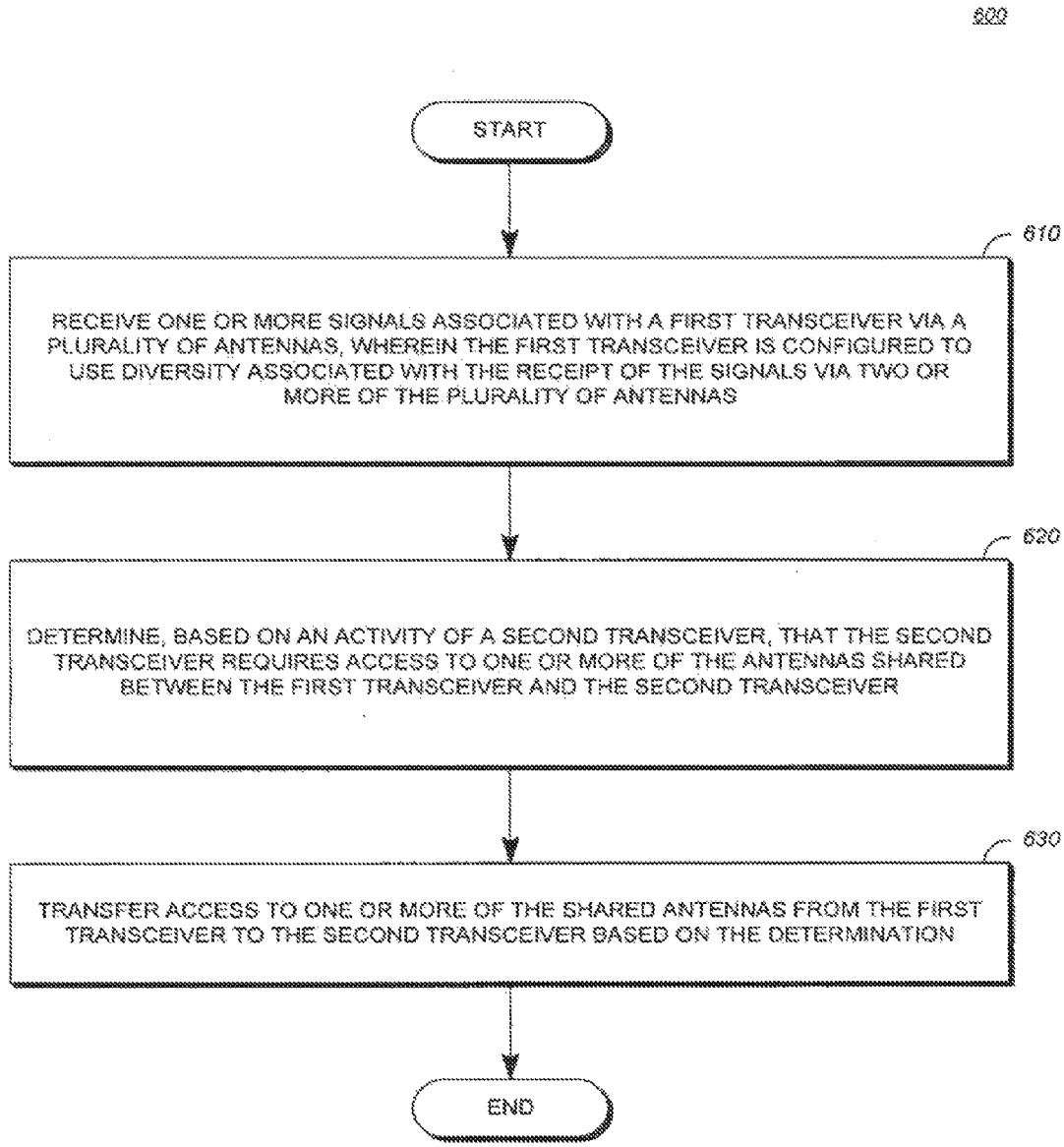
FIG. 6 is a flowchart illustrating example operations of the system of FIG. 1.

FIG. 6 is a flowchart illustrating example operations of the system of FIG. 1. More specifically, FIG. 6 illustrates an operational flow 600 representing example operations related to a dual antenna topology. While FIG. 6 illustrates an example operational flow 600 representing example operations related to the system 100 of FIG. 1, it should be appreciated however that the operational flow 600 is not limited to the example of system 100 and may be applied to other systems.

After a start operation, at block 610, one or more signals associated with a first transceiver may be received via a plurality of antennas, wherein the first transceiver is configured to use diversity associated with the receipt of the signals via two or more of the plurality of antennas. For example, the WLAN transceiver 102 may receive one or more WLAN signals via antenna 1 106A and antenna 2 106B, whereby the WLAN transceiver 102 may use diversity logic 114 to apply diversity to the received signals.

At block 620, based on an activity of a second transceiver, it may be determined that the second transceiver requires access to one or more of the antennas shared between the first transceiver and the second transceiver. For example, the WLAN transceiver 102 may determine that the BT_ACTIVE signal 112 has been asserted by BT transceiver 104, indicating activity or potential activity by the BT transceiver 104.

At block 630, access to one or more of the shared antennas may be transferred from the first transceiver to the second transceiver based on the determination. For example, the ACP 110 may toggle or activate switch 2 108B to provide access to antenna 2 to the Bluetooth transceiver 104.

Figure 7:
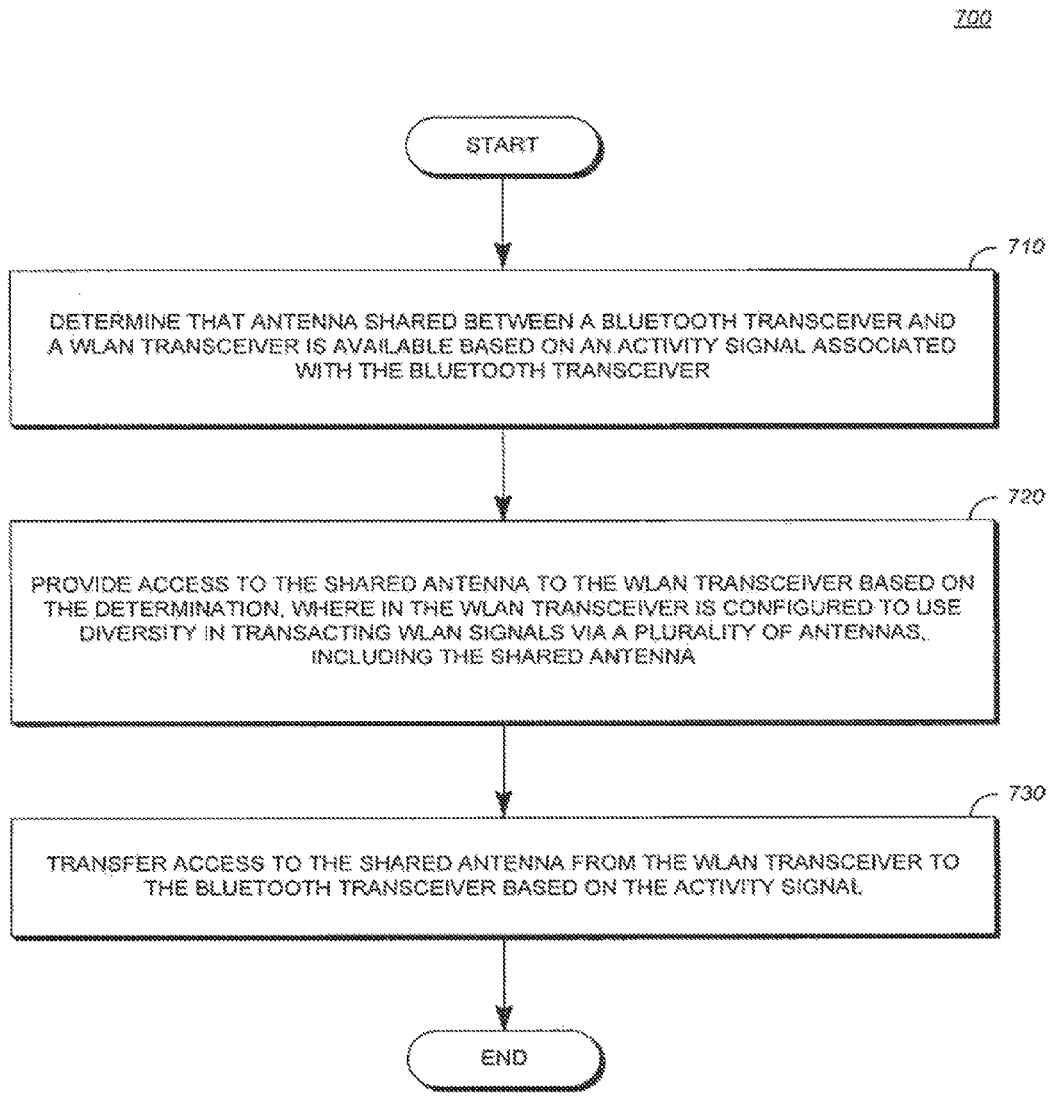
FIG. 7 is a flowchart illustrating example operations of the system of FIG. 1.

FIG. 7 is a flowchart 700 illustrating example operations of the system of FIG. 1. More specifically, FIG. 7 illustrates an operational flow 700 representing example operations related to a dual antenna topology. While FIG. 7 illustrates an example operational flow 700 representing example operations related to the system 100 of FIG. 1, it should be appreciated however that the operational flow 700 is not limited to the example of system 100 and may be applied to other systems.

After a start operation, at block 710, it may be determined that an antenna shared between a Bluetooth transceiver and a WLAN transceiver is available to the WLAN transceiver based on an activity signal associated with the Bluetooth transceiver. For example, the WLAN transceiver 102 may determine that the BT_ACTIVE signal 112 is not being asserted by the BT transceiver 104, which may indicate that the shared antenna (e.g., antenna 2 106B is available).

At block 720, access to the shared antenna may be provided to the WLAN transceiver based on the determination, wherein the WLAN transceiver is configured to use diversity in transacting WLAN signals via a plurality of antennas, including the shared antenna. For example, the ACP 110 may activate or toggle switch 2 108B such that the WLAN transceiver 102 may receive WLAN signals via antenna 2 106B and apply diversity to the received WLAN signals using the diversity logic 114.

At block 730, access to the shared antenna may be transferred from the WLAN transceiver to the Bluetooth transceiver based on the activity signal. For example, the WLAN transceiver 102 may determine that the BT_ACTIVE signal 112 has been asserted by the BT transceiver 104, and the ACP may toggle the switch 2 108B such that the BT transceiver 104 has access to transmit and/or receive BT signals via antenna 2 106B.

Figure 8:
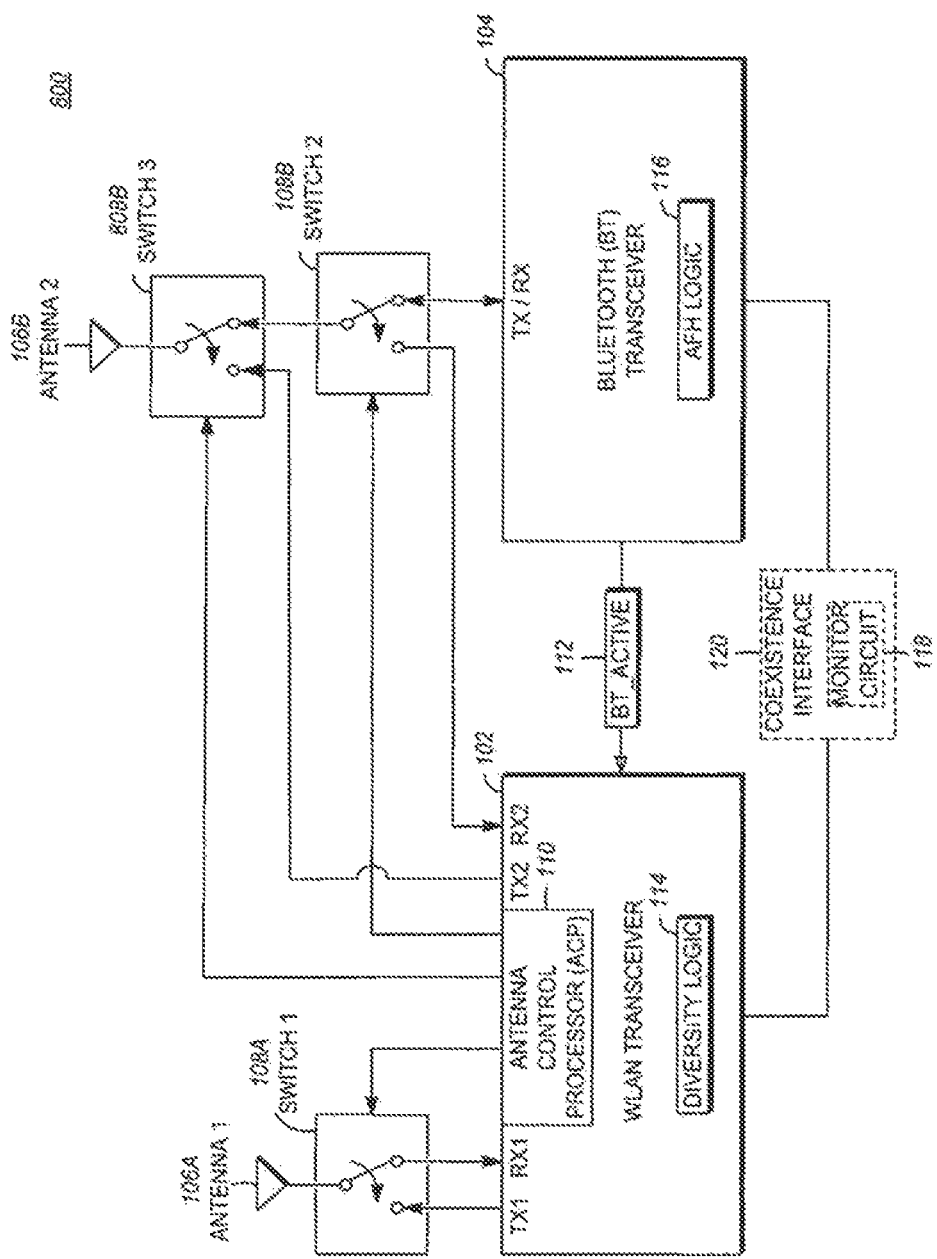
FIG. 8 is a block diagram of an example system including a dual antenna topology, according to an example embodiment.

FIG. 8 is a block diagram of an example system 800 this is similar to the example system 100, except that system 800 includes an additional switch, SWITCH 3, 808B, that allows the WLAN transceiver 102 to use either Antenna 1 106A or Antenna 2 106B to transmit signals to another device. Switch 3 808B can be a SPDT switch interposed between antenna 2 106B and switch 2 106B. When switch 3 808B is in a first position it can be operatively connected to a transmitter of WLAN transceiver 102, such that the WLAN transceiver can utilized with either antenna 1 or antenna 2 to transmit signals. When switch 3 808B is in a second position, it then can be operatively coupled either to a receiver or WLAN transceiver 102 or to the Bluetooth transceiver 104, depending on the position of Switch 2 108B. The antenna control processor 110 also is connected to the Switch 3 808B and can control the position of switch 808B.

Because the addition of switch 3 808B allows the WLAN transceiver 102 to transmit signals with either antenna 1 106A or antenna 2 106B, the WLAN transceiver may utilize transmission diversity to select either antenna 1 or antenna 2 for transmission of WLAN signals when the BT transceiver 104 is inactive. For example, the WLAN transceiver 106 may send a test signal to a receiver using both antenna 1 106A and antenna 2 106B, and the receiver may evaluate the strength of the signals received from the two antennas. Then the receiver may send a message to the system 800 to inform the system which signal was stronger. Based on the message from the receiver the antenna control processor may selected the appropriate antenna with which to send signals to the receiver with the strongest signal strength.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or

What is claimed is:

1. A method comprising:
    determining that a first transceiver requests access to a first antenna based on an indication from the first transceiver;
    determining that a first signal path associated with a second transceiver is coupled to the first antenna;
    detecting an interrupt signal based on the determination that the first signal path is coupled to the first antenna;
    terminating a packet transmission between the first antenna and the second transceiver based on the interrupt signal;
    storing a status of the terminated packet transmission, the status having information on a location within the packet transmission where the termination occurred; and
    transferring access to the first antenna from the second transceiver to the first transceiver, the first antenna accessed by the first transceiver through a second signal path, the second transceiver having access to a second antenna through a third signal path.

2. The method of claim 1, further comprising:
    determining a type of function associated with the first transceiver, the type of function being one or more of a data communication or a voice communication; and
    determining that arbitration between the first transceiver and the second transceiver is to be employed based on the type of function determined to be the data communication.

3. The method of claim 1, wherein transferring the access to the first antenna comprises sending a control signal to one or more switches having control over the access to the first antenna, the control signal causing the one or more switches to decouple the first signal path from the first antenna and couple the second signal path to the first antenna.

4. The method of claim 1, further comprising:
    determining that the first transceiver is in an idle state based on a second indication from the first transceiver; and
    transferring the access to the first antenna from the first transceiver back to the second transceiver based on the second indication.

5. The method of claim 1, further comprising:
    transmitting respective test signals through the first antenna and the second antenna;
    receiving respective response signals through the first antenna and the second antenna based on the respective test signals transmitted;
    determining a signal strength of each of the respective response signals; and
    selecting between the first antenna and the second antenna based on the signal strength.

6. The method of claim 1, further comprising:
    determining a guard time associated with the indication;
    determining that an existing communication from the second transceiver through the first antenna will be completed within the guard time, the guard time relating to a predetermined time duration for completing the existing communication or terminating the access since receiving the indication;
    terminating the access between the second transceiver and the first antenna within the guard time; and
    transferring the access to the first antenna from the second transceiver to the first transceiver within the guard time.

7. The method of claim 1, wherein the first transceiver is configured to communicate first type of signals and the second transceiver is configured to communicate second type of signals, the first type of signals being associated with a communication protocol that is different from the second type of signals.

8. The method of claim 7, further comprising:
    receiving the second type of signals through the first signal path and the third signal path;
    performing diversity on the received second type of signals;
    determining a signal strength of each signal in the second type of signals; and
    selecting one or more signals from the received second type of signals for processing based on the signal strength.

9. The method of claim 7, further comprising:
    performing diversity on the second type of signals for transmission; and
    transmitting the second type of signals through the first antenna and the second antenna based on the diversity performed.

10. The method of claim 7, further comprising:
    determining that a priority associated with the first type of signals is greater than a priority associated with the second type of signals, wherein the access is transferred from the second transceiver to the first transceiver based on the determined priority.

11. A system comprising:
    a first transceiver configured to communicate first type of signals through one or more of a first signal path with access to a first antenna or a second signal path with configurable access to a second antenna;
    a second transceiver configured to communicate second type of signals through a third signal path with configurable access to the second antenna; and
    a switch configured to select between the second signal path and the third signal path for access to the second antenna based on an indication from the second transceiver, the first transceiver configured to:
        communicate the first type of signals with the first antenna and the second antenna based on a status of the second transceiver included in the indication;
        determine a guard time associated with the indication;
        determine that an existing communication from the first transceiver through the second antenna will be completed within the guard time, the guard time relating to a predetermined time duration for completing the existing communication or terminating a packet transmission since receipt of the indication;

terminate the packet transmission between the second antenna and the first transceiver within the guard time; and transfer access to the second antenna from the first transceiver to the second transceiver within the guard time.

12. The system of claim 11, wherein the first transceiver comprises a diversity logic component configured to employ a diversity scheme on signals being communicated through the first antenna and the second antenna.

13. The system of claim 12, wherein the diversity logic component is configured to combine a first portion of a signal received through the first antenna with a second portion of the signal received through the second antenna to result in a receipt of the signal.

14. The system of claim 11, wherein the second transceiver comprises a frequency hopping logic component configured to determine whether a frequency band is occupied and select a next available frequency band if the frequency band is determined to be occupied, the second transceiver configured to communicate the second type of signals on the next available frequency band.

15. A non-transitory computer-readable storage medium comprising instructions that when executed by at least one processor cause a computing device to perform operations, the operations comprising:

determining that a first transceiver requests access to a first antenna based on an indication from the first transceiver;

determining that a first signal path associated with a second transceiver is coupled to the first antenna;

determining an interrupt signal from the indication;

terminating a packet transmission to the first antenna through the first signal path based on the interrupt signal;

storing a status of the terminated packet transmission, the status having information on a location within the packet transmission where the termination occurred; and transferring access to the first antenna from the second transceiver to the first transceiver, the first antenna accessed by the first transceiver through a second signal path, the second transceiver having access to a second antenna through a third signal path.

16. The non-transitory computer-readable storage medium of claim 15, wherein the operations further comprise:

communicating first type of signals through the first signal path with access to the first antenna; and receiving the indication from the first transceiver.

17. The non-transitory computer-readable storage medium of claim 15, wherein the operations further comprise:

receiving second type of signals through the first signal path and the third signal path;

performing diversity on the received second type of signals;

determining a signal strength of each signal in the second type of signals; and selecting one or more signals from the received second type of signals for processing based on the signal strength.

18. The non-transitory computer-readable storage medium of claim 15, wherein the operations further comprise:

determining a type of function associated with the first transceiver, the type of function being one or more of a data communication or a voice communication; and determining that arbitration between the first transceiver and the second transceiver is to be employed based on the type of function determined to be the data communication.

19. The non-transitory computer-readable storage medium of claim 15, wherein the operations further comprise:

determining that a priority associated with the first transceiver is greater than a priority associated with the second transceiver, wherein the access is transferred from the second transceiver to the first transceiver based on the determined priority.

* * * * *